(12) United States Patent  (10) Patent No.: US 8,271,901 B2
Gherardi  (45) Date of Patent: Sep. 18, 2012

(54) CROSS TAXONOMY NAVIGATION FROM A BREAD CRUMB IN A GRAPHICAL USER INTERFACE

(75) Inventor: Laurent Gherardi, Seattle, WA (US)

(73) Assignee: Demand Media, Inc., Santa Monica, CA (US)

( * ) Notice: Subject to any disclaimer, the term of this patent is extended or adjusted under 35 U.S.C. 154(b) by 791 days.

(21) Appl. No.: 11/747,837

(22) Filed: May 11, 2007

(65) Prior Publication Data

US 2008/0282199 A1  Nov. 13, 2008

(51) Int. Cl.
 G06F 3/048  (2006.01)
(52) U.S. Cl. ......... 715/825; 715/760; 715/789; 715/854
(58) Field of Classification Search .................. 715/854, 715/825, 789, 760
 See application file for complete search history.

(56) References Cited

U.S. PATENT DOCUMENTS

| | | | |
|---|---|---|---|
| 5,774,123 A | 6/1998 | Matson | |
| 5,806,079 A | 9/1998 | Rivette et al. | |
| 5,963,948 A | 10/1999 | Shilcrat | |
| 6,330,566 B1 | 12/2001 | Durham | |
| 6,667,751 B1 | 12/2003 | Wynn et al. | |
| 6,820,111 B1 | 11/2004 | Rubin et al. | |
| 2003/0045331 A1 | 3/2003 | Montebovi | |
| 2004/0128275 A1* | 7/2004 | Moehrle | 707/1 |
| 2005/0132018 A1 | 6/2005 | Milic-Frayling et al. | |

OTHER PUBLICATIONS

Microsoft, Microsoft Windows XP Professional Version 2002, pp. 1-9.*
Shultz, Windows XP Remote Desktop, Part 2, Nov. 28, 2001, http://www.win.net/optimator/WinWiz/Tips/WXPRDP2.htm, pp. 1-8.*
Explorer, Microsoft Internet Explorer, Copyright 1995-2004, pp. 2.*
PCT/US2008/063479 International Search Report and Written Opinion, Sep. 29, 2008, 11 pps.

* cited by examiner

*Primary Examiner* — Andrey Belousov
(74) *Attorney, Agent, or Firm* — Greenberg Traurig, LLP (57) ABSTRACT

Embodiments of the invention are directed to enabling a user to navigate to a web page or other resource in a taxonomy of resources using a crumb provided in a user interface. The crumb is associated with a category of web pages in the taxonomy. When a user indicates the crumb, such as hovering over the crumb, additional crumbs are displayed, so that the user may directly navigate to another web page in the taxonomy. The additional crumbs may be in the same, or a different category. The user can select a crumb from any category to navigate forward and backward in the taxonomy. The taxonomy may be independent of a storage structure for the web pages. The crumbs may be in a toolbar, script, or other module that interfaces with a local or remote taxonomy processor to access and dynamically manage the taxonomy of web pages.

21 Claims, 5 Drawing Sheets

CROSS TAXONOMY NAVIGATION FROM A BREAD CRUMB IN A GRAPHICAL USER INTERFACE

FIELD OF ART

The present invention is directed to navigating through electronic resources, and more particularly, to enabling a user to navigate across a taxonomy of content or other resources, such as a website structure of web pages.

BACKGROUND

Users of computing devices often navigate to web pages, program options, services, or other resources. Some navigation tools enable a user to navigate back to a previous resource, or forward to another resource. Some navigation tools also provide display elements that show direct, or nested links to other resources. A navigation sequence is sometimes represented as a series of "crumbs." Crumbs generally provide user interface elements, such as text or buttons, that show a linear sequence of navigation steps. A trail of crumbs is sometimes considered analogous to bread crumbs left along a path, so that someone can find a way back. A user can navigate to a prior resource by selecting one of the crumbs. Crumbs also generally indicate a taxonomy of categories of resources. For example, some crumbs displayed on a web page may indicate a storage structure, or a hierarchical structure of web pages in a web site.

However, crumbs generally do not show an entire nested structure of a taxonomy. Instead, crumbs generally show just a path along a taxonomy. Crumbs are generally limited to a specific navigation sequence or a specific relational structure between resources. Consequently, users typically must navigate up the taxonomy of previously accessed resources and then back down through the taxonomy of resources to reach a new desired resource. Users generally can not navigate directly to other resources. It is with respect to these considerations and others that the present invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the invention is directed to navigating through a taxonomy using one or more crumbs. A user can navigate to any resource in a taxonomy of resources through one or more user interface crumbs. The taxonomy need not be tied to a storage structure, file structure, or other predefined structure of resources. The taxonomy can be static or dynamically modified.

Illustrative Operating Environment

Figure 1:
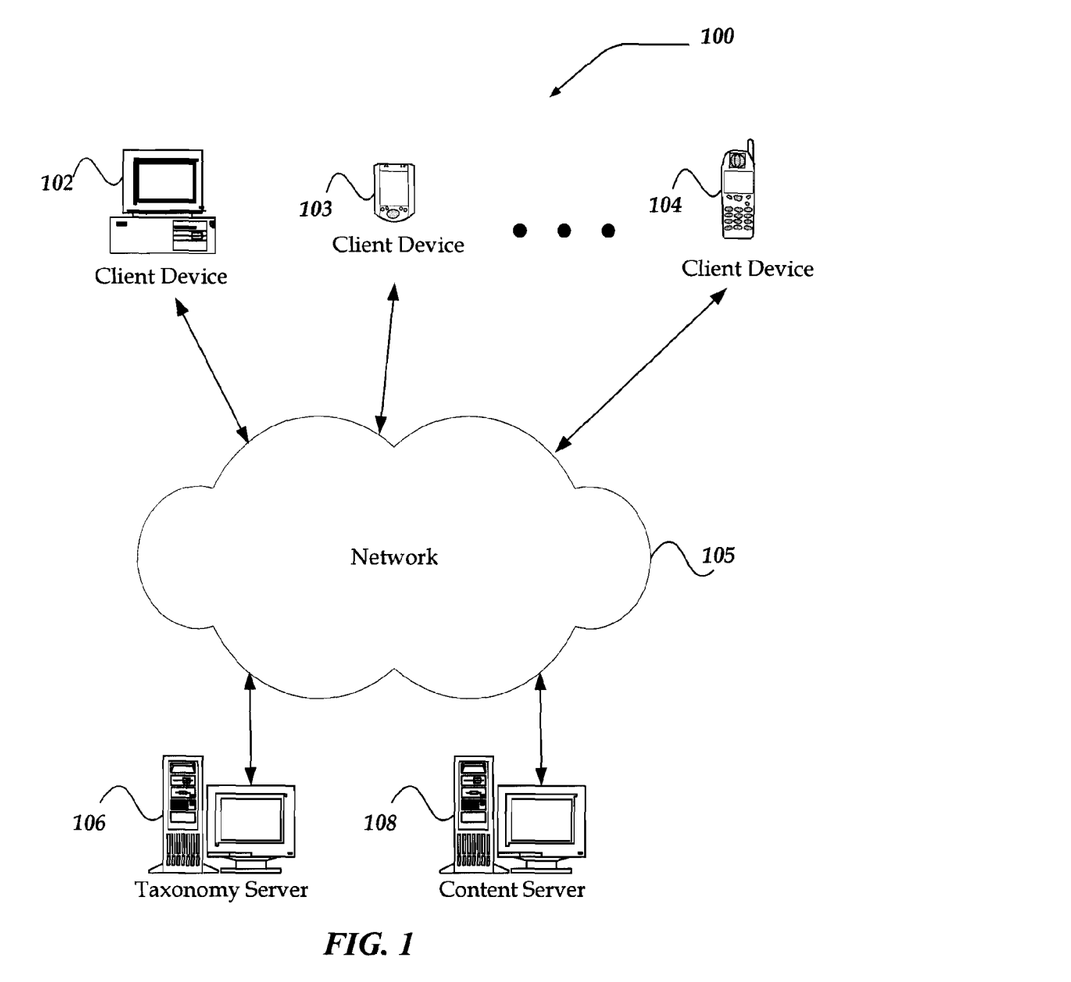
FIG. 1 illustrates a diagram of one embodiment of an exemplary system in which the invention may be practiced.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, a taxonomy server 106, and a content server 108. Network 105 is in communication with and enables communication between each of client devices 102-104, taxonomy server 106, and content server 108.

Client devices 102-104 may include virtually any electronic device with a user interface and/or capable of receiving and sending a message over a network, such as network 105, to and from another computing device, such as content server 108, each other, and the like. The set of such devices may include devices that typically connect using a wired communications medium such as personal computers, multiprocessor systems, microprocessor-based or programmable consumer electronics, network PCs, set-top boxes, appliances, and the like. Similarly, client devices 102-104 may be any device that is capable of connecting using a wired or wireless communication medium such as a personal digital assistant (PDA), pocket PC, wearable computer, and any other device that is equipped to communicate over a wired and/or wireless communication medium. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like.

Each client device within client devices 102-104 generally includes a user interface enabling a user to navigate through content or other information on the client device or that is remotely available from another device. Each client device within client devices 102-104 may also include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 15 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like. In essence, network 105 includes any communication method by which information may travel between client devices 102-104, taxonomy server 106, and/or content server 108.

The media used to transmit information in communication links as described above illustrates one type of computer-readable media, namely communication media. Generally, computer-readable media includes any media that can be accessed by a computing device. Computer-readable media may include computer storage media, communication media, or any combination thereof. By way of example, communication media includes wired media such as twisted pair, coaxial cable, fiber optics, wave guides, and other wired media and wireless media such as air or liquids for acoustic, RF, infrared, and other wireless media.

Additionally, computer-readable media typically embodies computer-readable instructions, data structures, program modules, or other data transmitted in communication media with a modulated data signal such as a data signal, carrier wave, or other transport mechanism and includes any information delivery media. The terms "modulated data signal," and "carrier-wave signal" includes a signal that has one or more of its characteristics set or changed in such a manner as to encode information, instructions, data, and the like, in the signal.

Taxonomy server 106 and content server 108 may comprise multiple computing devices or a single computing device. Taxonomy server 106 may provide administrative services, such as creation, modification, and management of structural relationships between resources, such as web pages, local content, application features, network services, or the like. Content server 108 may provide similar service and/or other services such as web sites, help content, online journals (e.g., blogs), photos, reviews, online services such as messaging, search, news, shopping, advertising, and/or the like. For example purposes, the operations of taxonomy server 106 and content server 108 are described together, and generally refer to taxonomy server 106. Briefly, taxonomy server 106 may include any computing device capable of connecting to network 105 and may manage content navigation services for a network user, such as a user of at least one of client devices 102-104. Devices that may operate as taxonomy server 106 include dedicated servers, personal computers, desktop computers, multiprocessor systems, microprocessor-based or programmable consumer electronics, network PCs, and the like.

Taxonomy server 106 may employ processes such as described in more detail below to create, modify, and otherwise manage taxonomy structures of content or other resources. Taxonomy server 106 also provides navigation services for users, and enables an administrator to manage navigation information for users of taxonomy server 106. Taxonomy server 106 or content server 108 may also enable users to send, receive, and manage messages. Taxonomy server 106 and/or any of clients 102-104 may be implemented on one or more computing devices, such as a client described with regard to FIG. 2.

Illustrative Client Device

Figure 2:
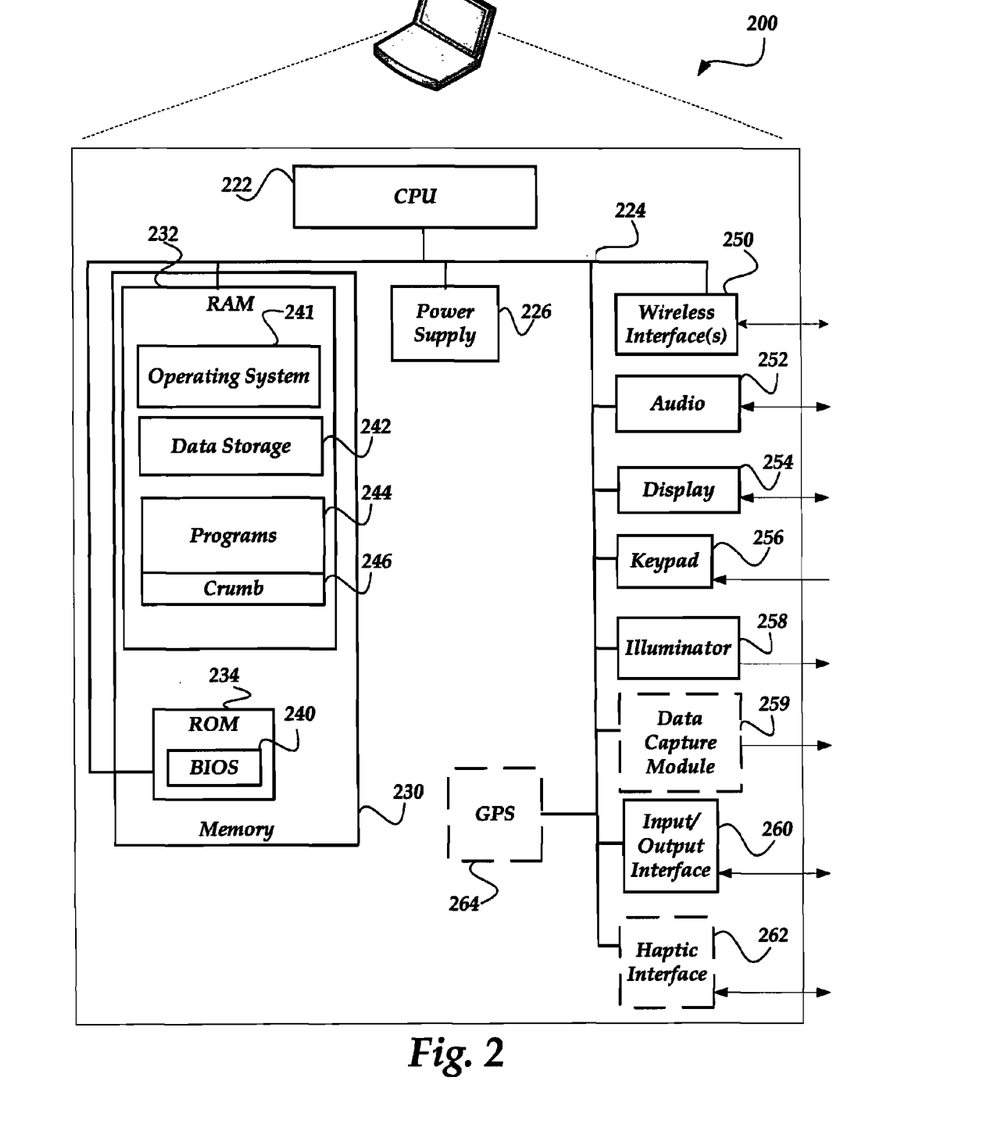
FIG. 2 shows a schematic diagram of one embodiment of an exemplary mobile device.

FIG. 2 shows an exemplary client device 200, according to one embodiment of the invention for use as a reference data collector device. In one embodiment, client device 200 is a mobile device, such as a laptop computer. Another example of a mobile device includes a PDA or a cellular telephone that is arranged to send and receive voice communications and messages such as SMS messages via one or more wireless communication interfaces. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Generally, client device 200 may comprise any mobile or stationary electronic device. Such devices include laptops, palmtops, PDAs, handheld computers, cellular telephones, smart phones, pagers, radio frequency (RF) devices, infrared (IR) devices, integrated devices combining one or more of the preceding devices, and the like. Client device 200 may also comprise other electronic devices such as personal computers, multiprocessor systems, microprocessor-based or programmable consumer electronics, network PCs, wearable computers, and the like.

Client device 200 may include many more, or fewer, components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of Windows®, UNIX, or LINUX®, or a specialized mobile communication operating system such as Windows Mobile™, the Symbian® operating system, or the like. The operating system may include, or interface with a Java® virtual machine module that enables control of hardware components and/or operating system operations via Java application programs.

Memory 230 further includes one or more data storage units 242, which can be utilized by client device 200 to store, among other things, programs 244 and/or other data. Programs 244 may include computer executable instructions which, when executed by client device 200, transmit, receive, render, and/or otherwise process markup pages such as HTML pages, XML pages, WAP pages (sometimes referred to as WAP cards), and the like. Accordingly, programs 244 may include a browser program of computer executable instructions, which may be run under control of operating system 241 to enable and manage requesting, receiving, and rendering markup pages and messages (e.g., HTTP, TCP/IP, SMS, MMS, IM, email, and/or other messages), audio, video, and enable telecommunication with another user of another client device. Other examples of application programs include calendars, contact managers, task managers, transcoders, database programs, word processing programs, spreadsheet programs, games, and so forth.

In addition, mass memory 230 stores a full-taxonomy navigation crumb 246, which may be run within a browser, within a web page, as an external module under control of operating system 241, or via another configuration. Full-taxonomy navigation crumb 246 enables a user to navigate through a taxonomy of resources such as web pages of a web site. In addition to backward navigation, a user may navigate forward in the taxonomy and may navigate directly to intermediary portions of the taxonomy.

Client device 200 also includes a power supply 226, one or more wireless interfaces 250, an audio interface 252, a display 254, a keypad 256, an illuminator 258, an optional data capture module 259, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station, or directly with another client device. Wireless interface 250 includes circuitry for coupling client device 200 to one or more wireless networks, and is constructed for use with one or more communication protocols and technologies including, but not limited to, TCP/IP, UDP, GSM, CDMA, TDMA, SMS, GPRS, WAP, UWB, IEEE 802.16 (WiMax), and the like.

Audio interface 252 is arranged to produce and/or receive audio signals such as the sound of a human voice, music, and the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a client device. Display 254 may also include a touch sensitive screen arranged to receive input from an object such as a stylus or a digit from a human hand.

Keypad 256 may comprise any input device arranged to receive input from a user. For example, keypad 256 may include a keyboard, a push button numeric dial, or the like. Keypad 256 may also include command buttons that are associated with selecting and performing changeable processes. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the mobile device to illuminate in response to actions. Illuminator 258 may further be used as a flash for image capture. An optional data capture module 259, such as a camera, may be included in client device 200. If the data capture module is included, the client device may obtain images, video, temperature, pressure, or other data.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Optional haptic interface 262 is arranged to provide tactile feedback to a user of the client device. For example, the haptic interface may be employed to vibrate client device 200 in a particular way when another user of a client device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), Enhanced Observed Time Difference (E-OTD), cell identifier (CI), service area identifier (SAI), enhanced timing advance (ETA), base station subsystem (BSS), or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Illustrative Network Device

Figure 3:
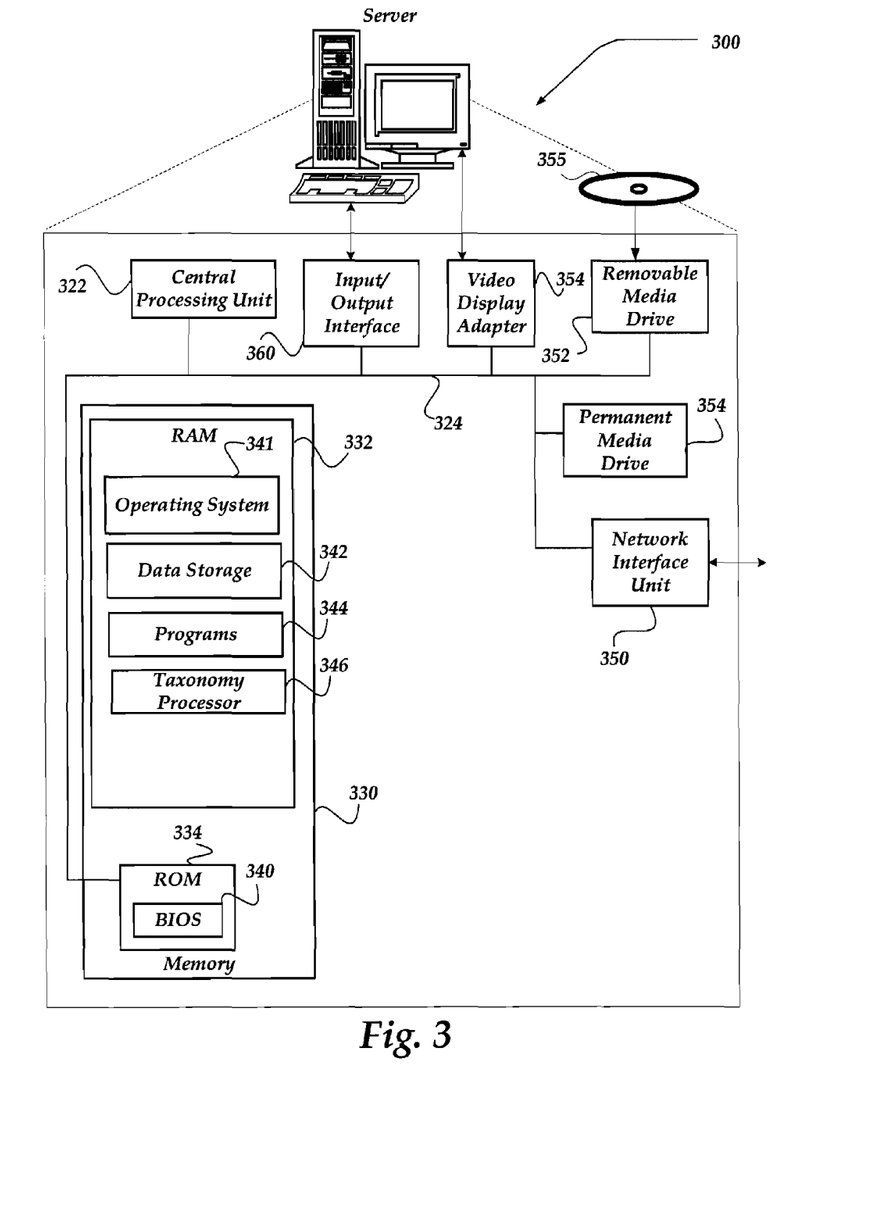
FIG. 3 illustrates a schematic diagram of one embodiment of an exemplary network device.

FIG. 3 shows one embodiment of a network device, according to one embodiment of the invention. Network device 300 may include many more, or fewer, components than those shown. The components shown, however, are sufficient to disclose an illustrative embodiment for practicing the invention. Network device 300 may represent, for example, taxonomy server 106, content server 108, or another client device of FIG. 1. For example purposes, network device 300 will be described as a server device.

As shown in the figure, server device 300 includes a processing unit 322 in communication with a mass memory 330 via a bus 324. Mass memory 330 generally includes a RAM 332, a ROM 334, and other storage means. Mass memory 330 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 330 stores a basic input/output system ("BIOS") 340 for controlling low-level operation of server device 300. The mass memory also stores an operating system 341 for controlling the operation of server device 300. It will be appreciated that this component may include a general purpose operating system such as a version of Windows, UNIX, LINUX, Solaris, or the like. The operating system may also include, or interface with a Java virtual machine module that enables control of hardware components and/or operating system operations via Java application programs.

Mass memory 330 further includes one or more data storage units 342, which can be utilized by server device 300 to store, among other things, programs 344 and/or other data. Programs 344 may include computer executable instructions which can be executed by server device 300 to implement a markup handler application, such as an HTTP handler application for transmitting, receiving, and otherwise processing HTTP communications, a WAP handler application for transmitting, receiving, and otherwise processing WAP communications, and the like. Similarly, programs 344 can include a secure socket layer (SSL) handler application for handling secure connections, such as initiating communication with an external application in a secure fashion. Other examples of application programs include content management applications, messaging applications, schedulers, calendars, web services, transcoders, database programs, word processing programs, spreadsheet programs, and so forth. Accordingly, programs 344 can process images, audio, video, or markup pages, enable telecommunication with another user of another electronic device, and/or other services.

In addition, mass memory 330 stores a taxonomy processor 346. Taxonomy processor 346 may include computer executable instructions, which may be run under control of operating system 341 to create, modify, provide, and otherwise manage taxonomy data for a collection of resources, such as a set of web pages in a website. In one embodiment, taxonomy processor 346 generally communicates with a full-taxonomy navigation crumb on a client device.

Server device 300 also includes an input/output interface 360 for communicating with input/output devices such as a keyboard, mouse, wheel, joy stick, rocker switches, keypad, printer, scanner, and/or other input devices not specifically shown in FIG. 3. A user of server device 300 can use input/output devices to interact with a user interface that may be separate or integrated with operating system 341, programs 344, and/or other modules. Interaction with the user interface includes visual interaction via a display, and a video display adapter 354.

Server device 300 may include a removable media drive 352 and/or a permanent media drive 354 for computer-readable storage media. Removable media drive 352 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 355, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 350, server device 300 can communicate with a wide area network such as the Internet, a local area network, a wired telephone network, a cellular telephone network, or some other communications network, such as network 105 in FIG. 1. Network communication interface unit 350 is sometimes known as a transceiver, transceiving device, network interface card (NIC), and the like.

Illustrative User Interface

Figure 4:
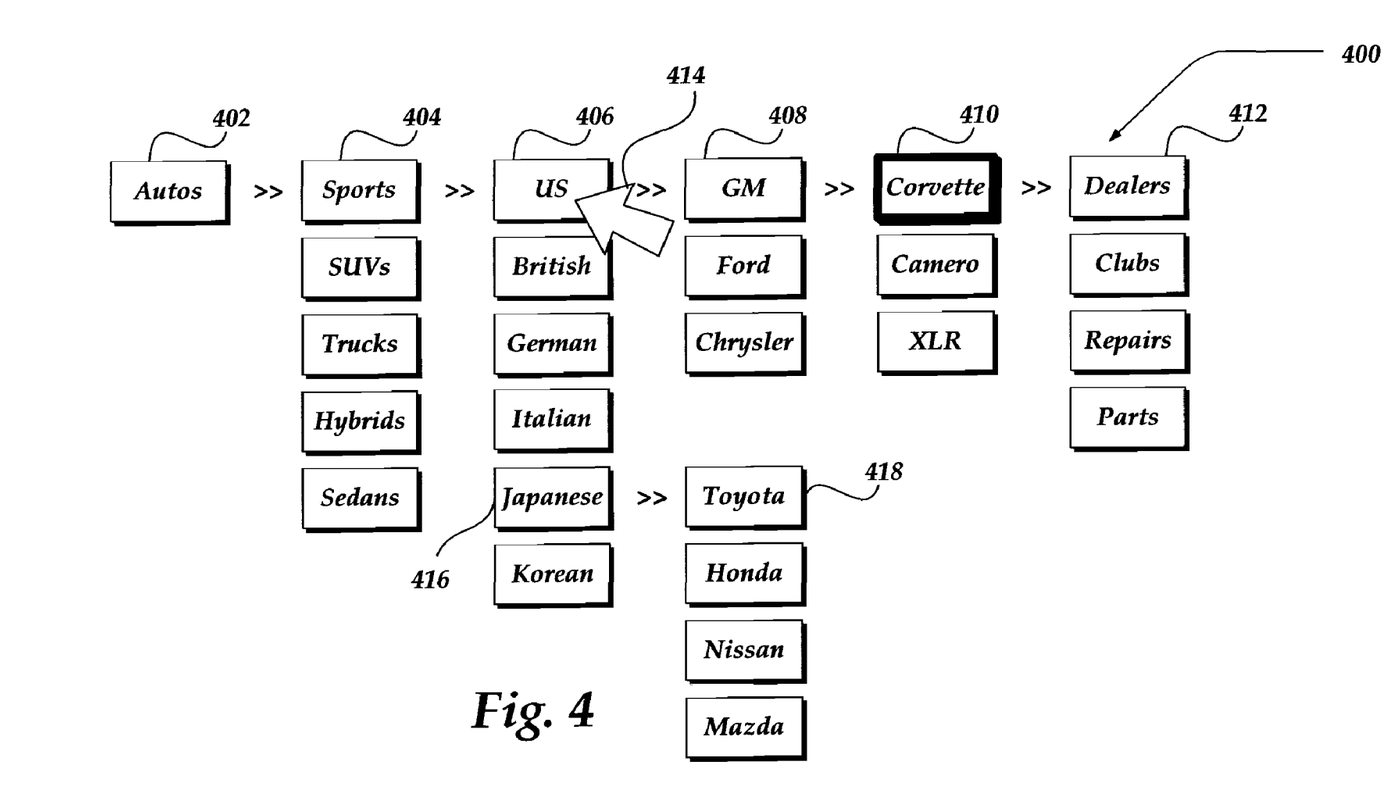
FIG. 4 illustrates an example user interface for enabling a user to navigate across taxonomy of resources.

FIG. 4 illustrates an example user interface 400 for enabling a user to navigate a full taxonomy of resources. Resources may comprise web pages, local content, processor-executable instructions, images, audio data, or the like. In this example embodiment, the taxonomy comprises a website of web pages. User interface 400 may be provided in a web page, a browser toolbar, an application toolbar, and operating system interface, or the like. This example is described in terms of a web page that includes a script module for processing crumbs displayed in the web page.

For instance, crumbs 402 through 412 are displayed in a web page, indicating a navigation sequence through the taxonomy of web pages to arrive at a currently displayed web page. A user may arrive at a current web page in any manner. In this example, a user selected a series of links to arrive at the currently displayed web page. The series of links are represented by a set of elements referred to as crumbs. As indicated above, a trail of crumbs is sometimes considered analogous to bread crumbs left along a path, so that someone can find a way back. Specifically in this example, the user first selected an autos link that is represented by an autos crumb 402. Subsequently, the user selected a sports car link associated with a sports crumb 404. The user further selected a US link associated with a US crumb 406. The user also selected a General Motors link associated with a GM crumb 408. Finally, the user selected a Corvette link associated with a Corvette crumb 410. Thus, the current web page includes content related to Corvette automobiles. Crumbs 402-410 would generally be displayed in an upper portion of the Corvette web page.

Each crumb is generally associated with a category of web pages in the taxonomy. For example, US crumb 406 is generally associated with the category of countries which produce automobiles. To navigate to another web page in the taxonomy of web pages, a user may indicate one of the crumbs to activate a display of other crumbs that correspond to other web pages. The other web pages may be in the same category and or in other categories. For example, a user may position and hover a cursor 414 over US crumb 406 to indicate that they use their wishes to see other countries that produce automobiles. When the use hovers the cursor over US crumb 406, crumbs associated with web pages in the same category may be displayed. In another embodiment, the user may indicate a crumb by clicking on a crumb. This may cause a drop-down menu to appear showing crumbs associated with web pages in the same category. In other embodiments, indicating a crumb may include speaking a crumb identifier, circling a crumb with a tablet stylus, applying a light to a crumb, or other technique. For example purposes only, the following description will refer to hovering over a crumb to indicate the crumb. The user of may select one of the other crumbs to link to a different web page in the category. For instance, a user may click on Japanese crumb 416 to access a web page with content regarding Japanese automobiles. In another embodiment, the user may simply hover over Japanese crumb 416, causing display of a sub-category of crumbs. In the figure, a number of Japanese manufacturers is displayed. The user may then click on one of the crumbs in the sub-category to navigate forward in the taxonomy to a web page for a particular manufacturer, without having to first navigate to the Japanese automobiles web page.

In another embodiment, crumbs of other categories may also be displayed, so that the user may navigate to any web page in the taxonomy. For example, the crumbs under sports crumb 404, GM crumb 408, and Corvette crumb 410, may all be displayed, so that the user can navigate to any corresponding web page. Additional sub-categories of crumbs may optionally be displayed. For instance, dealers crumb 412 may be displayed, so that the user can navigate forward to a corresponding Corvette dealers web page. Other crumbs in that same sub-category can also be displayed. The current Corvette web page may be indicated by highlighting the corresponding crumb 410.

When the user selects one of the crumbs, the corresponding web page is accessed and displayed. A new set of crumbs are also displayed with the new web page. The crumbs may be displayed in any configuration. For example, the crumbs may be displayed vertically, with additional crumbs in each category displayed horizontally. Alternatively, the crumbs may be displayed in a cascading fashion, in a hierarchical tree, or other configuration.

Figure 5:
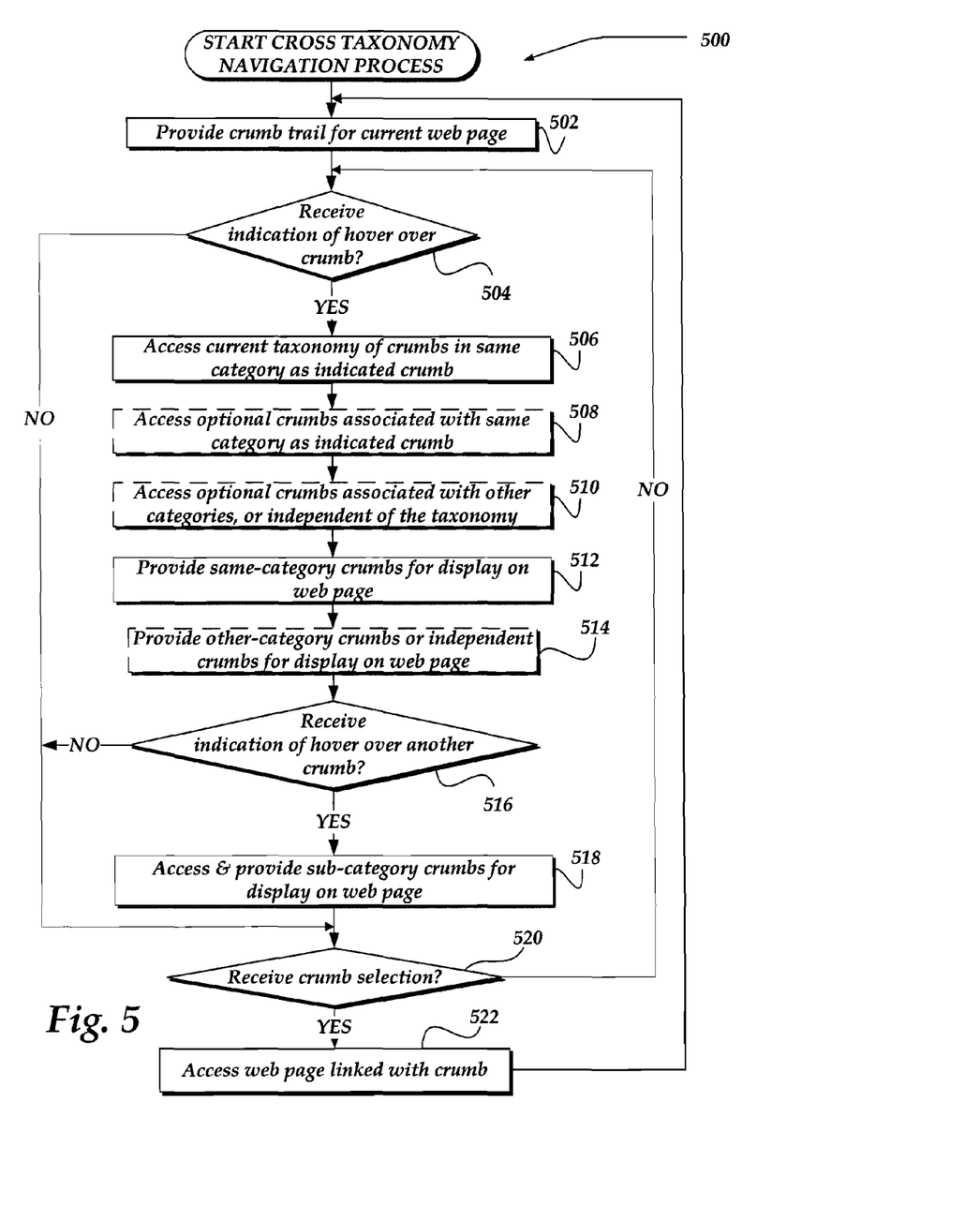
FIG. 5 illustrates a flow chart of example logic for enabling a user to navigate across a taxonomy of resources.

FIG. 5 illustrates a flow chart 500 of example logic for enabling a user to navigate across a full taxonomy of resources. At an operation 502, the taxonomy processor provides a crumb trail for a currently accessed web page. At a decision operation of 504, in the taxonomy processor determines whether it has received an indication that a user is hovering a cursor over a crumb. If the taxonomy processor receives an indication of hovering, the taxonomy processor accesses a current taxonomy of crumbs in a same category as the indicated crumb, at an operation 506.

At an optional operation 508, the taxonomy processor accesses crumbs that may be optionally associated with the same category. For example, the taxonomy processor may access an advertisement or a crumb associated with all web page that may be of interest to the user and in the same category as the indicated crumb. The taxonomy processor may dynamically determine optional crumbs based on the user's prior click behavior, user profile, advertising data, or the like. Similarly, the taxonomy processor or may optionally access crumbs associated with other categories, or that are independent of the taxonomy, at an optional operation 510. Here, as discussed above, the taxonomy processor may provide crumbs before all, or a number of other categories, so they use their may navigate to any web page in the taxonomy.

At an operation 512, the taxonomy processor provides the same-category crumbs for display on the current web page. Similarly, the taxonomy processor provides other-category crumbs, or independent crumbs, at an operation 514, for display on the current web page. The taxonomy processor may be run on a network device that is remote from a client device that displays the web page. Alternatively, the taxonomy processor may be run on the client device that displays the web page.

At a decision operation 516, the taxonomy processor determines whether it receives a secondary hover indication over one of the previously provided crumbs. For example, as shown in FIG. 4, the taxonomy processor may determine whether a cursor is now hovering over Japanese crumb 416. If the taxonomy processor receives an indication of secondary hovering over one of the previously provided crumbs, the taxonomy processor accesses and provides crumbs in a corresponding sub-category, at an operation 518. If the taxonomy processor receives an indication of secondary hovering over one of the previously provided crumbs, the taxonomy processor continues processing.

After the taxonomy processor processes the hover indication(s), or if the taxonomy processor does not receive a hover selection, the taxonomy processor determines whether it has received a crumb selection, at a decision operation 520. A crumb selection may be indicated by a mouse click, a double click, or other selection of one of the crumbs. If the taxonomy processor does not receive a crumb selection, control returns to decision operation 504 to await a hover indication. If the taxonomy processor receives a crumb selection, the taxonomy processor accesses the corresponding web paged linked with the selected crumb, at an operation 522. The corresponding web page is then communicated to the client and displayed. Control returns to operation 502 to provide the corresponding crumb trail for the new current web page. The process generally continues unless interrupted.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent is:

1. A method comprising:
providing, via a computing device, a representation of a crumb trail for a currently accessed web page in a taxonomy of web pages to a user interface on a user device, the trail comprising a navigation sequence, the navigation sequence comprising a series of links selected by the user to arrive at the currently accessed web page;
receiving, via the computing device, an indication to a first crumb within the crumb trail from the user interface, wherein the first crumb indicates a category of the taxonomy of web pages and wherein the first crumb is linked to a first web page in the taxonomy of web pages;
providing, via the computing device, to the user interface, a second crumb in response to receiving the indication to the first crumb, wherein the second crumb is linked to a second web page in the taxonomy of web pages, wherein the second web page is in the same category of the taxonomy as the first web page, wherein the user interface comprises a browser that renders the first crumb with the first web page and renders the second crumb upon receiving the indication of the first crumb, and wherein the second crumb is dynamically determined based on user profile data of a user associated with the user device;

providing, via the computing device, to the user interface, a third crumb in response to receiving the indication of the first crumb, wherein the third crumb is linked to an advertisement relating to the same category of the taxonomy of web pages as the first web page, wherein the advertisement is independent of the taxonomy of web pages;

receiving, via the computing device, an indication of selection of the second crumb from the user interface; and providing, via the computing device, the second web page to the user interface in response to selection of the second crumb.

2. The method of claim 1, wherein the taxonomy of web pages is independent of a storage arrangement of the web pages.

3. The method of claim 1, wherein receiving the indication to the first crumb comprises receiving an indication that an input device cursor hovered over a display element associated with the first crumb.

4. The method of claim 1, further comprising rendering the second resource through the user interface with the second crumb in place of the first crumb.

5. The method of claim 1, further comprising providing to the user interface a fourth crumb in response to receiving the indication of the first crumb, wherein the fourth crumb is linked to a third web page in the taxonomy of web pages, wherein the third web page is in a different category of the taxonomy from the first web page.

6. The method of claim 1, further comprising providing to the user interface a plurality of crumbs in response to receiving the indication of the first crumb, wherein the plurality of crumbs indicate the entire taxonomy of the web pages.

7. The method of claim 1, wherein either of the first web page or the second web page comprise one of the following: a web page, content data, processor executable instructions, image data, and audio data.

8. The method of claim 1, wherein the first crumb is implemented with one of the following: a browser toolbar and a script within a web page.

9. The method of claim 1, further comprising determining the second crumb additionally based on content of the first web page and user behavior data.

10. A non-transitory computer-readable storage medium storing computer-readable instructions, which when executed, cause a system to perform:

providing a representation of a crumb trail for a currently accessed web page in a taxonomy of web pages to a user interface on a user device, the trail comprising a navigation sequence, the navigation sequence comprising a series of links selected by the user to arrive at the currently accessed web page;

receiving an indication to a first crumb within the crumb trail from the user interface, wherein the first crumb indicates a category of the taxonomy of web pages and wherein the first crumb is linked to a first web page in the taxonomy of web pages;

providing, to the user interface, a second crumb in response to receiving the indication to the first crumb, wherein the second crumb is linked to a second web page in the taxonomy of web pages, wherein the second web page is in the same category of the taxonomy as the first web page, wherein the user interface comprises a browser that renders the first crumb with the first web page and renders the second crumb upon receiving the indication of the first crumb, and wherein the second crumb is dynamically determined based on user profile data of a user associated with the user device;

providing to the user interface, a third crumb in response to receiving the indication of the first crumb, wherein the third crumb is linked to an advertisement relating to the same category of the taxonomy of web pages as the first web page, wherein the advertisement is independent of the taxonomy of web pages;

receiving an indication of selection of the second crumb from the user interface; and providing the second web page to the user interface in response to selection of the second crumb.

11. A network device for providing access to a web page in a taxonomy of web pages, comprising:

a processor;

a communication interface in communication with the processor and with a network; and a memory in communication with the processor and storing data and instructions that cause the processor to perform a plurality of operations, including:

providing, a representation of a crumb trail for a currently accessed web page in a taxonomy of web pages to a user interface on a user device, the trail comprising a navigation sequence, the navigation sequence comprising a series of links selected by the user to arrive at the currently accessed web page;

receiving an indication to a first crumb within the crumb trail from the user interface, wherein the first crumb a level of the taxonomy of web pages and wherein the first crumb is linked to a first web page in the taxonomy of web pages;

providing to the user interface a second crumb in response to receiving the indication to the first crumb, wherein the second crumb is linked to a second web page in the taxonomy of web pages, wherein the second web page is in the same level of the taxonomy as the first web page, wherein the user interface comprises a browser that renders the first crumb with the first web page and renders the second crumb upon receiving the indication of the first crumb, and wherein the second crumb is dynamically determined based on user profile data of a user associated with the user device;

providing to the user interface a third crumb in response to receiving the indication of the first crumb, wherein the third crumb is linked to an advertisement relating to the same category of the taxonomy of web pages as the first web page, wherein the advertisement is independent of the taxonomy of web pages;

receiving an indication of selection of the second crumb from the user interface; and providing the second web page to the user interface in response to selection of the second crumb.

12. The network device of claim 11, wherein the taxonomy of web pages is independent of a storage arrangement of the electronic resources.

13. The network device of claim 11, wherein at least one of the first web page and the second web page is stored at a remote network node coupled to the communication interface.

14. The network device of claim 11, wherein the instructions further cause the processor to perform the operation of providing to the user interface a fourth crumb in response to receiving the indication of the first crumb, wherein the fourth crumb is linked to a third web page in the taxonomy of web pages, wherein the third web page is at a different level of the taxonomy from the first electronic resource.

15. The network device of claim 11, wherein the instructions further cause the processor to perform the operation of modifying the taxonomy in response to an instruction provided through an administrator interface.

16. The network device of claim 11, wherein the network device receives the indication to the first crumb through the communication interface coupled through the network to a client device that runs the user interface.

17. The network device of claim 11, wherein the network device comprises a mobile device.

18. The method of claim 1, wherein the third crumb is dynamically determined based on a user's prior click behavior.

19. The method of claim 1, wherein the third crumb is dynamically determined based on a user's user profile.

20. The network device of claim 11, wherein the third crumb is dynamically determined based on a user's prior click behavior.

21. The network device of claim 11, wherein the third crumb is dynamically determined based on a user's user profile.

* * * * *